US011383445B2

(12) United States Patent
Hertling et al.

(10) Patent No.: US 11,383,445 B2
(45) Date of Patent: Jul. 12, 2022

(54) FORMING LAYERS OF BUILD MATERIAL OF A THREE-DIMENSIONAL PRINTING SYSTEM

(71) Applicant: HEWLETT-PACKARD DEVELOPMENT COMPANY, L.P., Houston, TX (US)

(72) Inventors: William E. Hertling, Vancouver, WA (US); Benjiman White, Vancouver, WA (US); Mike Whitmarsh, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 959 days.

(21) Appl. No.: 16/074,851

(22) PCT Filed: Apr. 4, 2017

(86) PCT No.: PCT/US2017/025943
§ 371 (c)(1),
(2) Date: Aug. 2, 2018

(87) PCT Pub. No.: WO2018/186837
PCT Pub. Date: Oct. 11, 2018

(65) Prior Publication Data
US 2021/0197480 A1     Jul. 1, 2021

(51) Int. Cl.
*B29C 64/393* (2017.01)
*B33Y 10/00* (2015.01)
(Continued)

(52) U.S. Cl.
CPC .......... *B29C 64/393* (2017.08); *B29C 64/218* (2017.08); *B29C 64/232* (2017.08);
(Continued)

(58) Field of Classification Search
CPC .......... B33Y 10/00; B33Y 30/00; B33Y 50/02
(Continued)

(56) References Cited

U.S. PATENT DOCUMENTS 8,119,053 B1   2/2012  Bedal et al.
8,568,124 B2  10/2013  Brunermer
(Continued)

FOREIGN PATENT DOCUMENTS

CN   201760596 U   3/2011
EP    2923824 A1   9/2015
(Continued)

OTHER PUBLICATIONS

Shanjani et al., "Material Spreading and Compaction in Powder-based Solid Freeform Fabrication Methods: Mathematical Modeling", Retrieved from Internet: http://sffsymposium.engr.utexas.edu/Manuscripts/2008/2008-36-Shanjani.pdf, Sep. 10, 2008, 12 pages.

*Primary Examiner* — Md Azad
(74) *Attorney, Agent, or Firm* — HP Inc. Patent Department

(57) ABSTRACT

According to one aspect, there is provided a method of forming a layer of build material on a build platform of a three-dimensional printing system. The method comprises obtaining characteristics of a build volume to be processed, determining characteristics of a volume of build material to be used to form the layer, forming an intermediate volume of build material having the determined characteristics, and spreading the intermediate volume of build material over the build platform to form the layer.

15 Claims, 8 Drawing Sheets

(51) Int. Cl.
  *B33Y 30/00* (2015.01)
  *B33Y 50/02* (2015.01)
  *B29C 64/232* (2017.01)
  *B29C 64/245* (2017.01)
  *B29C 64/236* (2017.01)
  *B29C 64/218* (2017.01)
(52) U.S. Cl.
  CPC .......... *B29C 64/236* (2017.08); *B29C 64/245* (2017.08); *B33Y 10/00* (2014.12); *B33Y 30/00* (2014.12); *B33Y 50/02* (2014.12)
(58) Field of Classification Search
  USPC ........................................................ 700/118
  See application file for complete search history.

(56) References Cited

U.S. PATENT DOCUMENTS

| | | | |
|---|---|---|---|
| 8,888,480 B2 | 11/2014 | Yoo et al. | |
| 10,549,517 B2* | 2/2020 | Crump | B29C 64/118 |
| 2004/0006405 A1* | 1/2004 | Chen | G05B 19/4099 |
| | | | 700/119 |
| 2011/0278773 A1* | 11/2011 | Bokodi | B29C 64/259 |
| | | | 264/497 |
| 2014/0039663 A1* | 2/2014 | Boyer | B33Y 10/00 |
| | | | 700/118 |
| 2014/0255666 A1* | 9/2014 | Stucker | B29C 64/153 |
| | | | 428/201 |
| 2015/0266235 A1 | 9/2015 | Page | |
| 2016/0067928 A1* | 3/2016 | Mark | B33Y 10/00 |
| | | | 264/401 |
| 2017/0021564 A1* | 1/2017 | Ooba | B29C 64/209 |
| 2018/0154484 A1* | 6/2018 | Hall | B23K 26/12 |

FOREIGN PATENT DOCUMENTS

| | | |
|---|---|---|
| WO | 2007114895 A2 | 10/2007 |
| WO | 2017014785 A1 | 1/2017 |

\* cited by examiner

FORMING LAYERS OF BUILD MATERIAL OF A THREE-DIMENSIONAL PRINTING SYSTEM

BACKGROUND

Additive manufacturing, commonly referred to as three-dimension or 3D printing, enables objects to be generated on a layer-by-layer basis, for example through the selective solidification of a build material.

Powder-based 3D printing systems, for example, typically form successive thin layers of a particulate build material and selective solidify portions of each layer that represent a cross-section of a 3D object. Selective solidification techniques may include, for example, use of a printable fusing agent in combination with application of fusing energy to cause portions of the build material on which fusing agent is printed to absorb more energy than portions of build material on which no fusing agent is printed. The portions on which fusing agent is printed melt and solidify to form part of the 3D object being printed, whereas non-fused build material remains in a generally non-solidified state and may be removed and, in some cases, reused in the generation of further 3D objects.

BRIEF DESCRIPTION

Examples will now be described, by way of non-limiting example only, with reference to the accompanying drawings, in which.

Figure 6A:
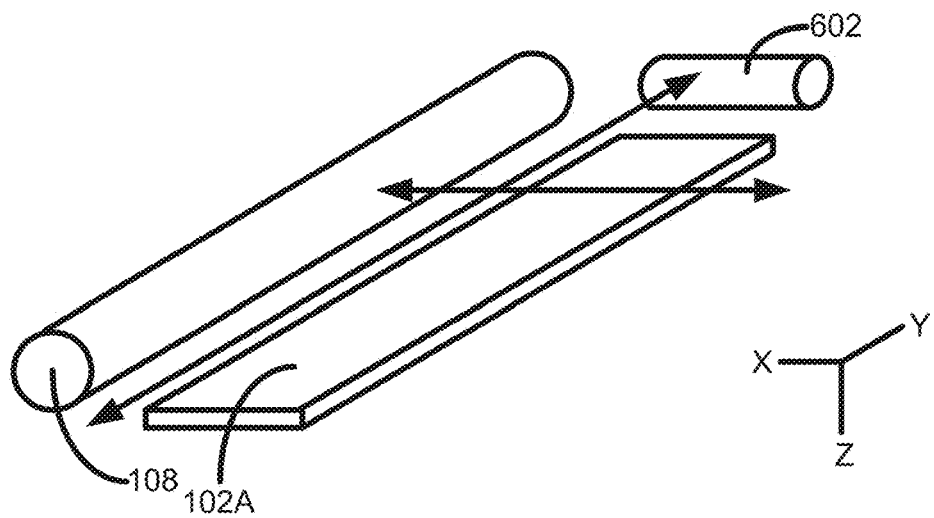
Figure 6B:
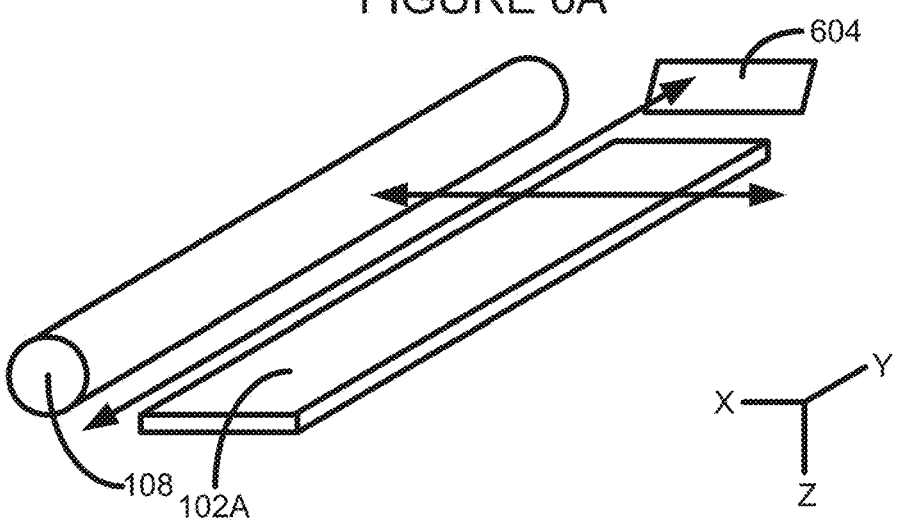
Figure 6C:
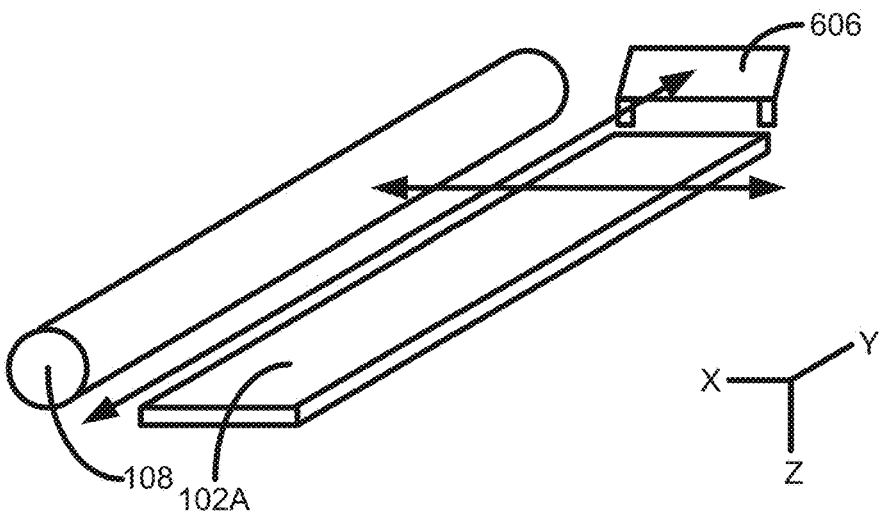
Figure 7A:
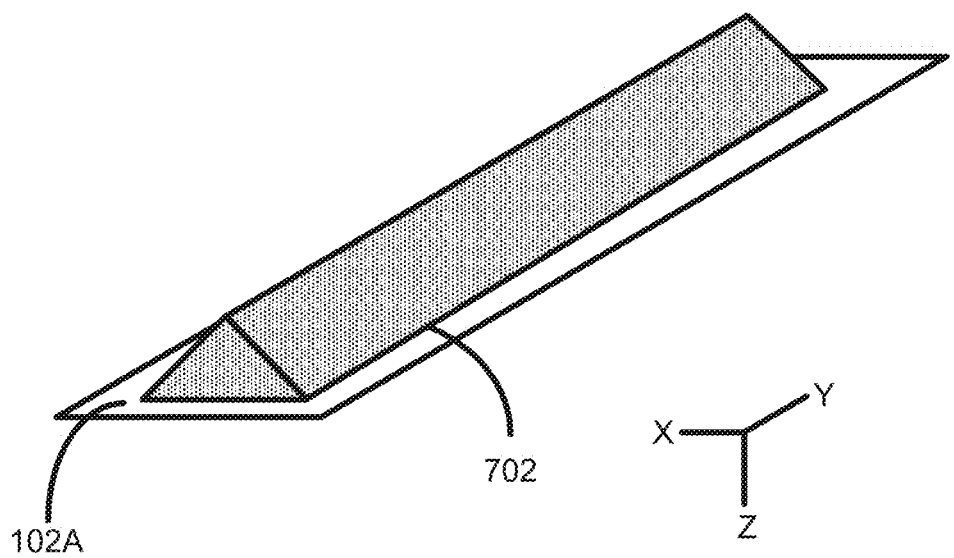
Figure 7B:
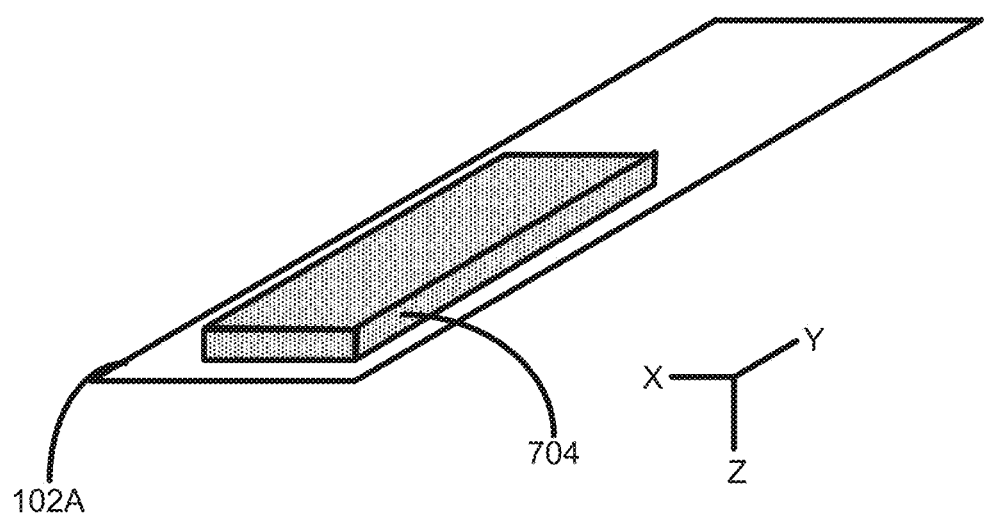
Figure 7C:
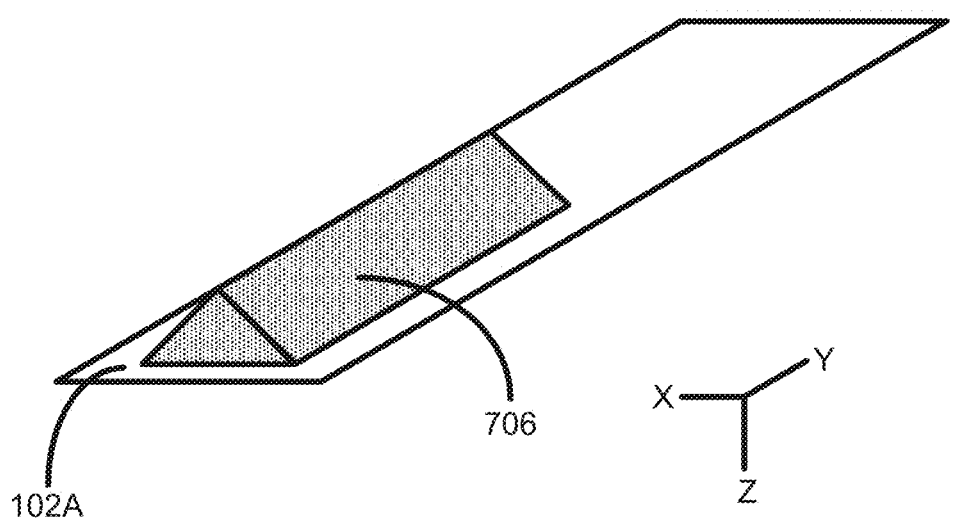
Figure 7D:
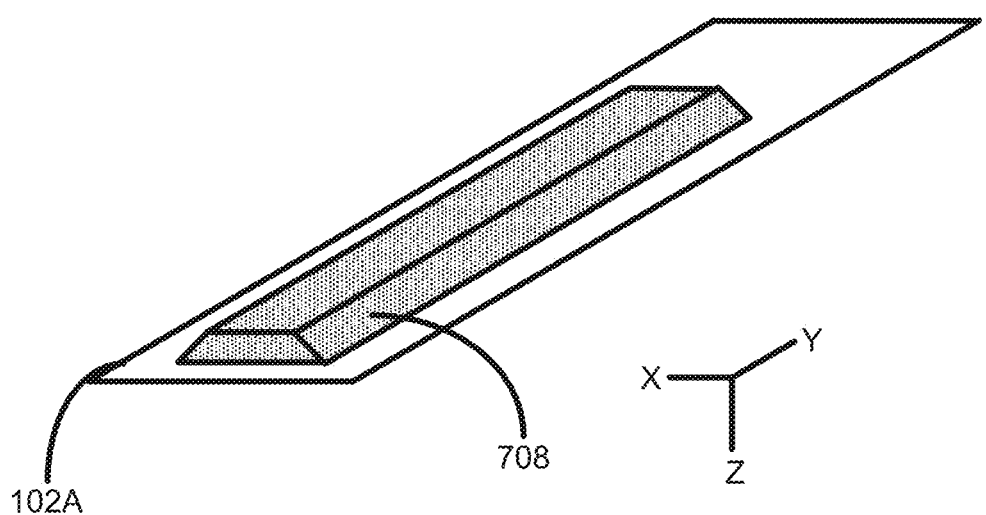

FIGS. 6A, 6B, and 6C illustrate different examples of a build material preparation module;

FIGS. 7A and 7B illustrate preparing a volume of build material according to an example; and FIGS. 7C and 7D illustrate preparing a volume of build material according to an example.

DETAILED DESCRIPTION

Figure 1A:
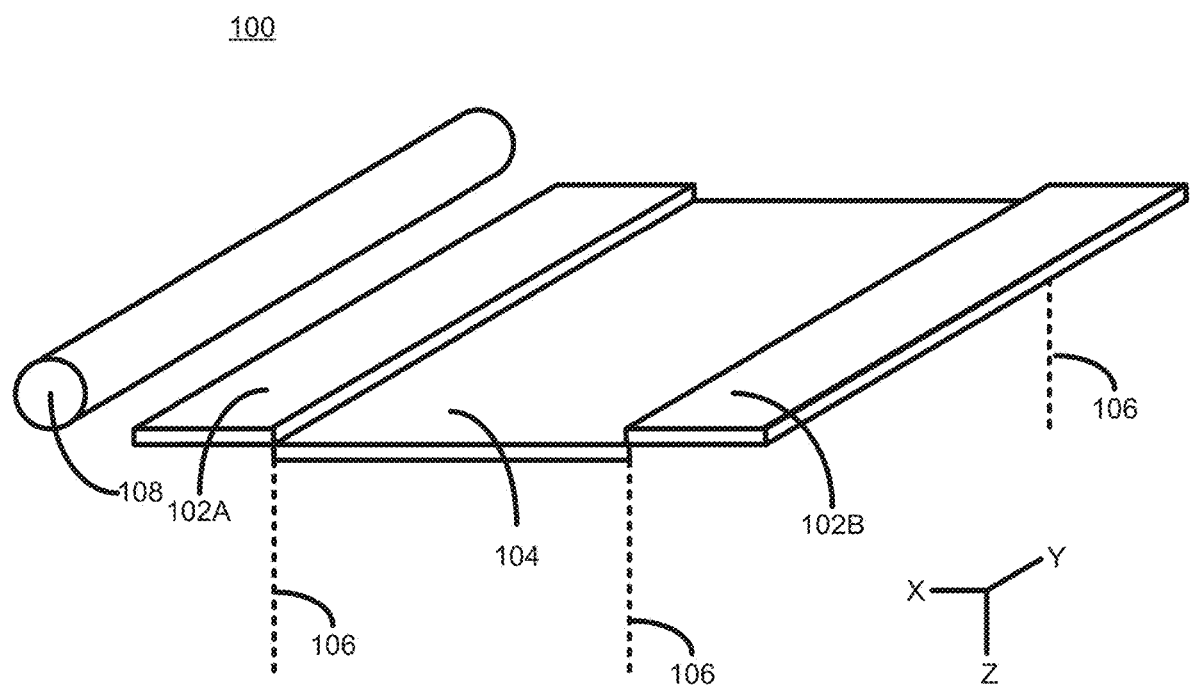
FIGS. 1A and 1B illustrate respectively an isometric and a plan view of a 3D printing system according to one example.
Figure 1B:
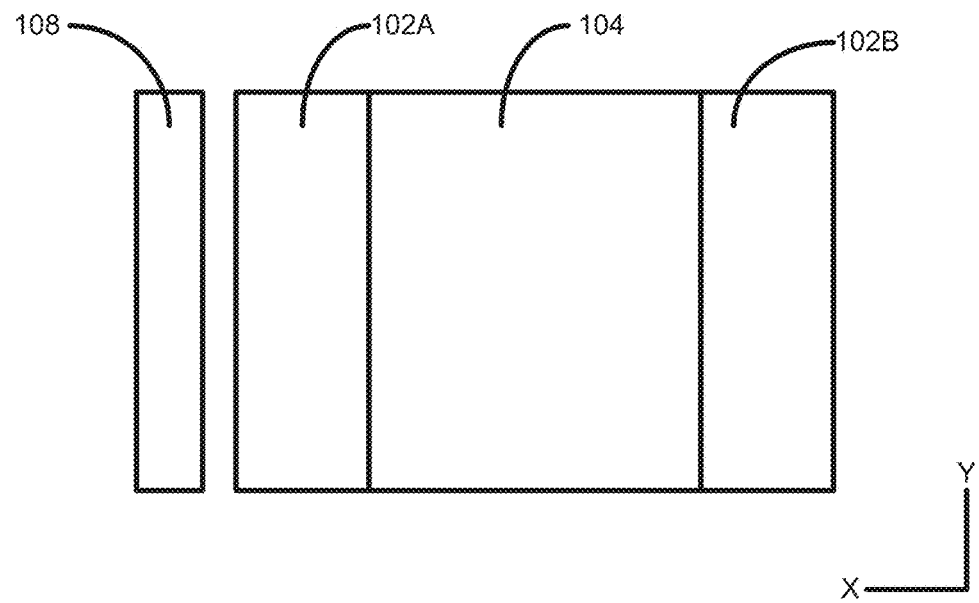

Referring now to FIG. 1 there is shown an illustration of a portion of a 3D printing system 100. FIG. 1A shows an isometric view and FIG. 1B shows a corresponding plan view.

The 3D printing system 100 comprises a build material support 102A on which a volume of build material may be provided. Generally, a volume of build material is provided along the entire, or a large portion thereof, length (y-axis) of the build material support 102A. A volume of build material may be provided on the build material support 102A using any suitable build material deposition process, which may include, for example, an overhead hopper, from a rotatable vane, or in any suitable manner.

Build material provided on the build material support 102A may be spread on a build platform 104, or on layers of build material previously formed thereon. Spreading of build material across the build platform 104 may be performed by a primary spreader or recoater module 108, for example by moving the recoater 108 along the x-axis. The primary recoater module 108 may comprise, for example, a roller, a wiper, or the like. Typically the base of the recoater module 108 is vertically positioned at the same level as the build material support 102A, such that substantially all build material provided on the build material support 102A is spread over the build platform 104.

The build platform 104 is part of a build unit that forms a build chamber, as illustrated by dotted lines 106. The 3D printing system 100 forms 3D objects within the build chamber as it selectively solidifies portions of each formed layer of build material. After each layer of build material is selectively solidified the build platform 104 is lowered, along the z-axis, to enable a new layer of build material to be formed thereon. Depending on the particular 3D printing system used, each layer of build material formed may have, for example, a height in the region of about 50 to 120 microns.

In some examples a secondary build material support 102B may be provided adjacent the build platform 104 opposite the build material support 102A.

FIG. 2 shows a plan view illustration of a typical build material spreading operation.

Figure 2A:
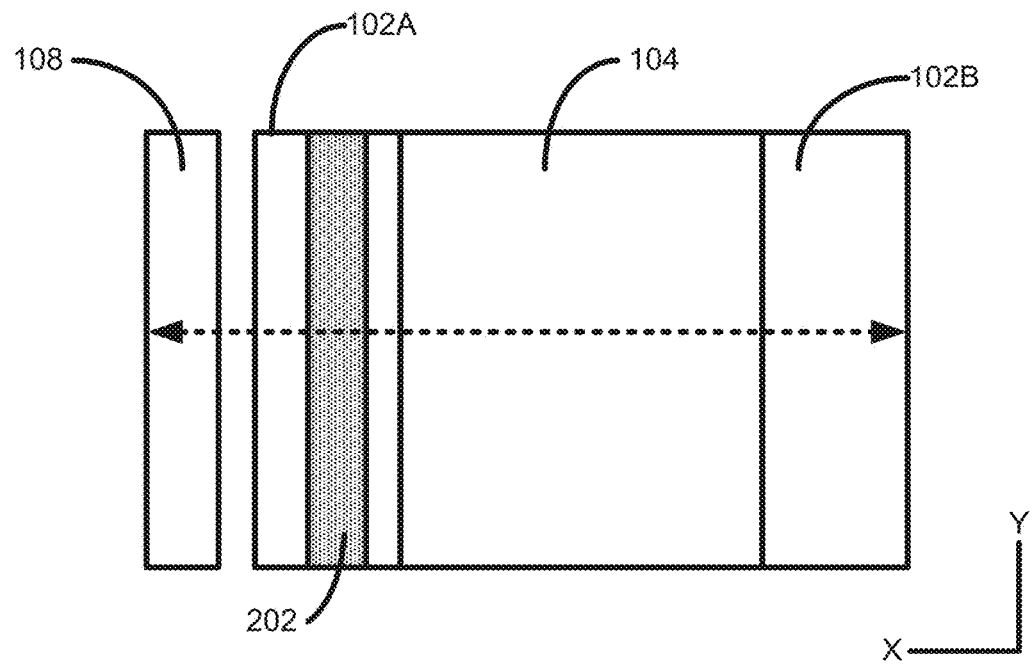
FIG. 2A and FIG. 2B illustrate a build material spreading operation according to one example.

FIG. 2A shows an initial volume of build material 202 that has been provided on the build material support 102A. The volume of build material 202 may have been deposited, for example, by an overhead hopper, a build material feed tray, or the like, along substantially the whole length of the build material support 102A. The volume of build material 202 is sufficient to enable a complete layer of build material to be formed on the build platform 104, for example taking into account parameters that may include: the x and y axis dimensions of the build platform; the height of the build platform 104 below the level of the build material support 102A in the z-axis; and the desired density of the formed layer of build material. To ensure that a complete layer of build material will be formed, the volume of build material 202 comprises an additional 'safety volume', which may be in the range, for example, of between about 10 to 30% of the theoretical amount of build material required for any particular layer.

Figure 2B:
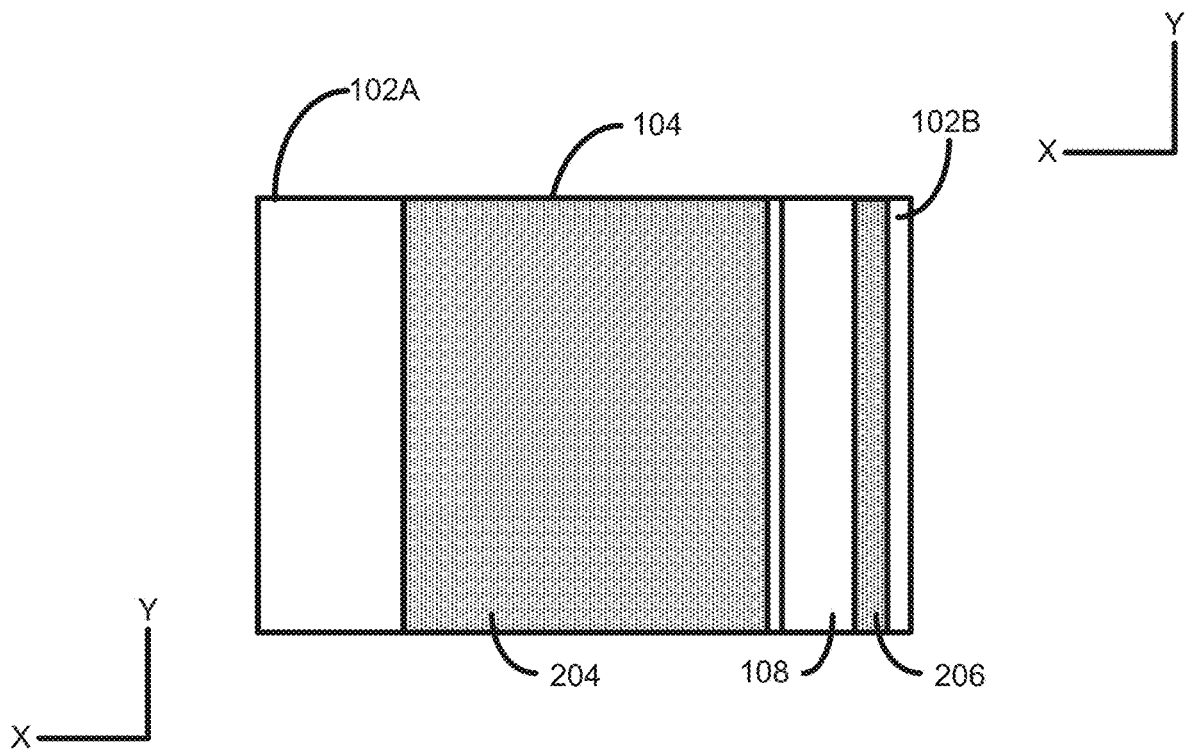

FIG. 2B shows the result of the recoater 108 having spread the build material from the build material support 102A and over the build platform 104 in a direction from left to right along the x-axis. As can be seen, a volume of excess build material 206 is formed in front of the recoater 108 on the build material support 102B. This excess volume may, for example, be swept by the recoater into a build material recovery store (not shown), or may be swept back over the build platform 104 in the reverse direction.

Such 3D printing systems form and process full layers of build material, that is layers of build material which cover the entirety of the build platform. Whilst such operation is efficient when a large portion of the build chamber is used for generating 3D objects, the efficiency is reduced when only a small portion of the build chamber is to be used. This may occur, for example, if a user only has a small object to generate. Where only a small portion of a large build chamber is used to generate 3D objects, a large quantity of build material remains unsolidified.

Figure 3A:
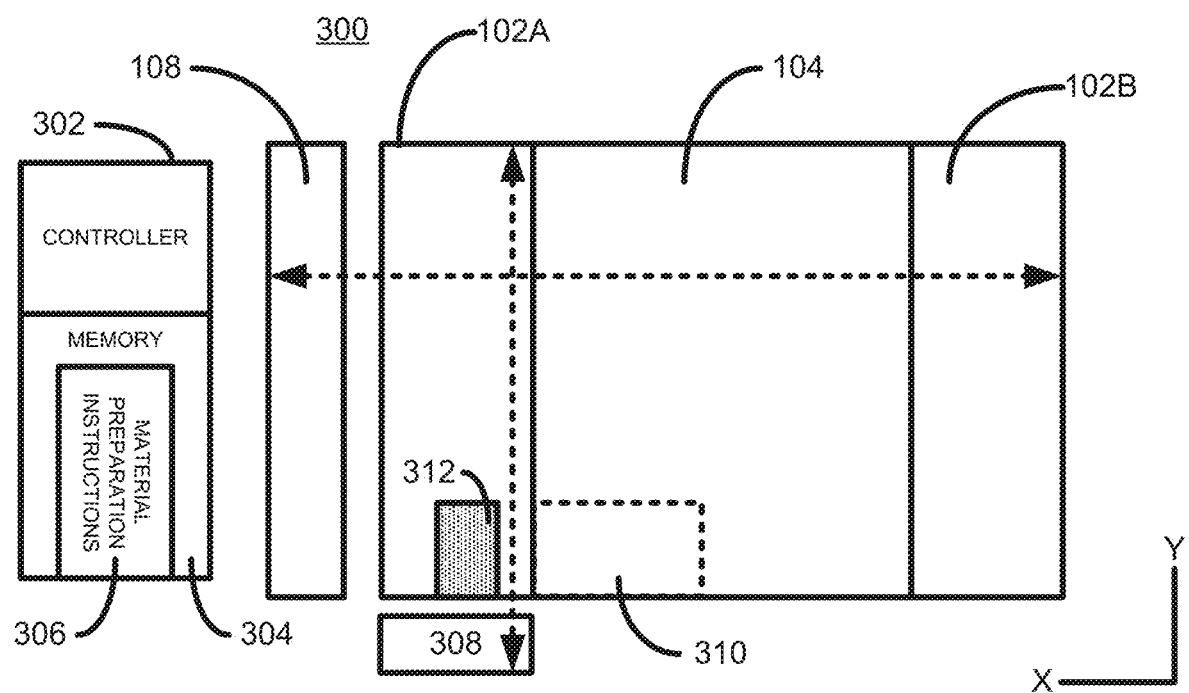
FIG. 3A and FIG. 3B illustrate a build material spreading operation according to one example.
Figure 3B:
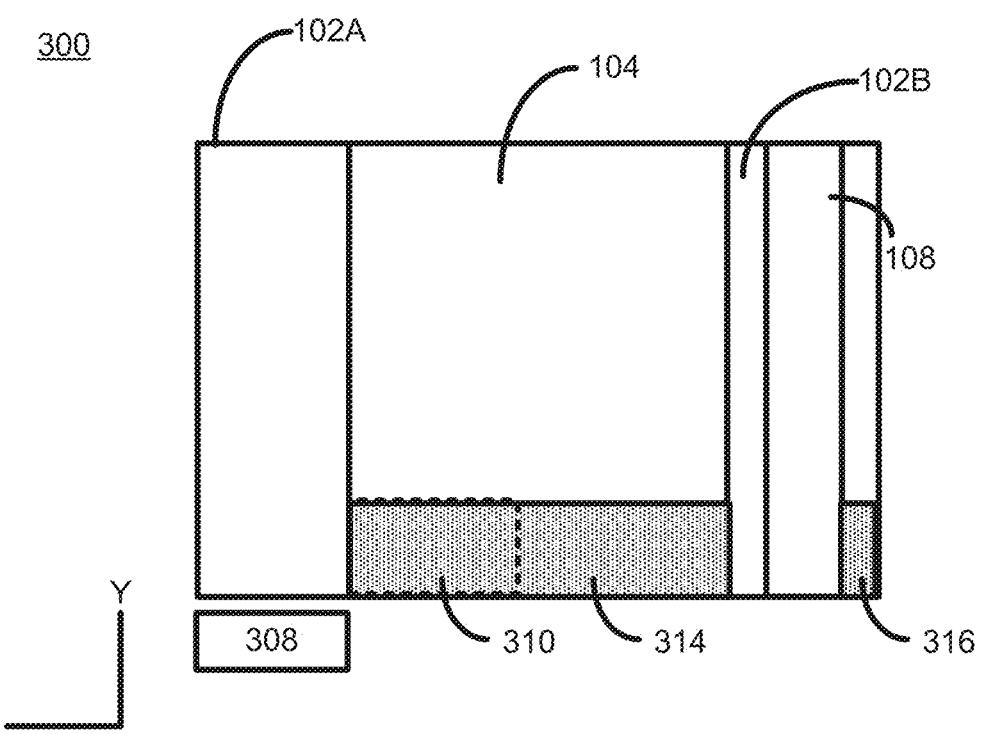

Referring now to FIG. 3, there is shown a 3D printing system 300 that enables only a portion of the surface of a build platform, and hence only a portion of the volume of a build chamber, to be used for the generation of 3D objects. This enables a smaller quantity of build material to be used for generating smaller 3D objects, which in turn may help reduce the cost of generating such objects. In some 3D printing systems the cost of the build material is one of the major costs of generating 3D objects, whether the build material is solidified or remains non-solidified.

Figure 4:
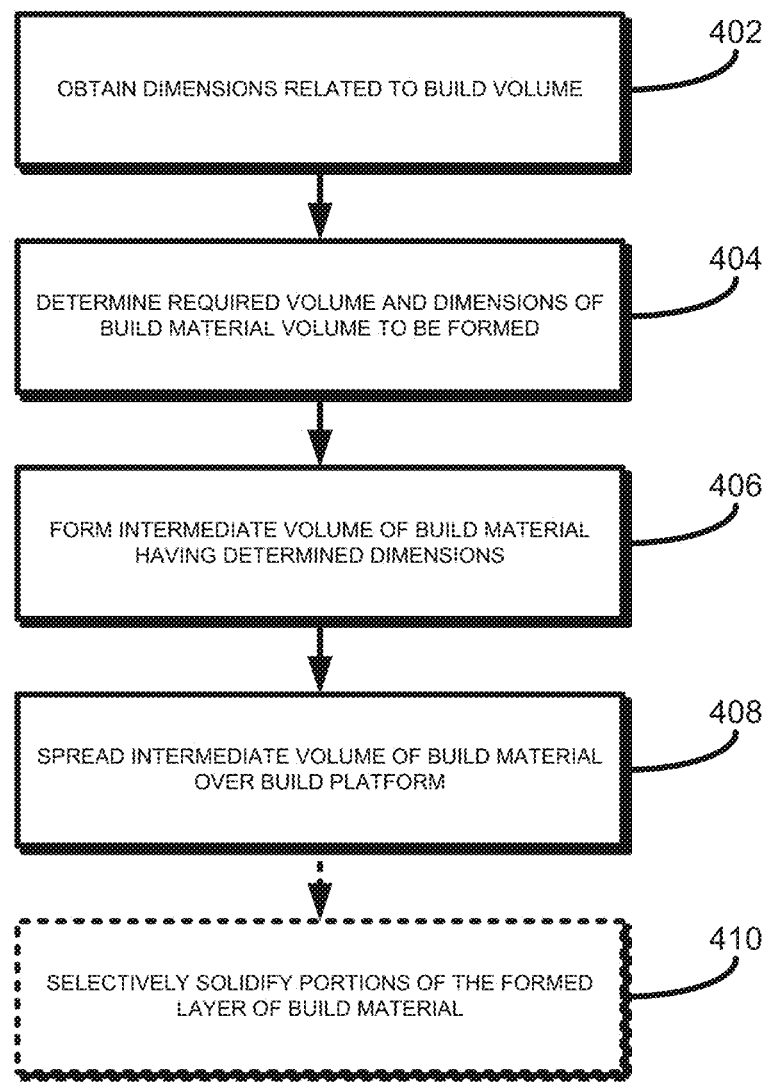
FIG. 4 is a flow diagram illustrating an example method of forming a layer of build material according to one example.

The 3D printing system 300 is controlled by a controller 302. The controller 302 is coupled to a memory 304 in which are stored processor executable build material preparation instructions 306. The build material preparation instructions 306 control elements of the 3D printing system to prepare build material on the build material support 102A, as will be described further below with additional reference to the flow diagram of FIG. 4.

The 3D printing system 300 additionally comprises a build material preparation module 308. The preparation module 308 is movable in the y-axis across the build material support 102A. In some examples, the preparation module 308 is also movable in the z-axis to enable the height of the preparation module 308 above the build material support 102A to be adjusted, as will be described further below. The preparation module 308 may be mounted, for example, on a height adjustable carriage or gantry (not shown) or may be otherwise height adjustable.

At block 402, the controller 302 obtains dimensions or characteristics related to a virtual build volume in which one or more 3D objects are disposed and which is to be processed by the three-dimensional printer. The virtual build volume may, for example, be a digital representation of a physical build volume. The virtual build volume may be obtained, for example, from a suitable user interface, from a computer aided design application, from a computer aided design generated digital file, from a digital print job, or in any suitable manner. In one example, the controller 302s obtains dimensions related to an object to be generated by the 3D printing system 300. The controller 302 may, in this case, determine the dimensions of build volume in which the object may be generated. The determined build volume is illustrated in FIG. 3 as build volume 310.

At block 404, the controller 302 determines a volume of build material that is needed to form each layer of the build volume 310 as well as the dimensions of the volume of build material that is to be provided on the build material support 102A. The volume may be calculated, for example, by determining the x and y-axis dimensions of the build volume, and the height of each layer of build material to be processed.

At block 406, the controller 302 controls elements of the 3D printing system 300, such as the build material preparation module 308, to form an intermediate volume 312 of build material having the determined dimensions on the build material support 102A. As illustrated, the formed volume 312 of build material has a y-axis dimension that is the same, or is substantially the same, as the y-axis dimension of the build volume 310. In other examples, however, the y-axis dimension of the formed volume 312 of build material may be increased by a suitable amount, such as by up to 10% or by up to 20% or by up to 30%, depending on different criteria. Such criteria may include, for example: the type of selective solidification technique used by the 3D printing system 300; the angle of repose of the build material; build material spreading characteristics; and characteristics of the build material containment system used.

Different techniques may be used to form the intermediate volume 312 of build material, as will be discussed below in greater detail.

At block 408, the controller 302 controls the recoater 108 to spread the intermediate volume 312 of build material in the x-axis over the build platform 104.

Once the build material has been spread over and formed on the build platform 104, the controller 302 may control elements of the 3D printing system 300 to selectively solidify portions of the formed layer of build material based on geometric data of the object or objects to be generated, as shown in block 410. The block is illustrated in dotted lines as it does not directly form part of the build material preparation process.

As illustrated in the example shown in FIG. 3, the intermediate volume 312 of build material formed on the build material support 102A was prepared such that its y-axis dimension is substantially the same as the y-axis dimension of the determined build volume 310. However, the quantity of build material provided was greater than that required and has resulted in a layer of build material being formed on the build platform 104 having an x-axis dimension larger than the x-axis dimension of the determined build volume. In the example shown, an amount of excess build material 316 has been formed on the build material support 102B. However, such a system enables a 3D object to be generated in a build volume smaller than the entire build chamber 106, and hence may help improve the efficiency of the 3D printing system 300, for example by reducing the quantity of build material used compared to forming layers of build material on the whole surface of the build platform 104.

Using the system described herein one or more edges of the spread layer of build material may not be supported by the walls of the build chamber 106. Depending on the characteristics of the build material, for example the angle of repose or the flowability of the build material, in some cases 3D objects may be satisfactorily generated even when one or more of the edges of the formed layer of build material are not supported by a solid structure such as a build volume wall. In other cases, however, any unsupported edges of each formed layer of build material may be consolidated, for example, by the 3D printing system 300 selectively solidifying a portion of each of unsupported edge in addition to selectively solidifying portions of the layer build material corresponding to the object or objects being generated. In this way, a supporting wall may be generated by the 3D printing system, during the 3D printing of an object, to provide support to each non-supported edge of each layer of build material. An example of such a system is described in International patent application PCT/US2016/043194 which is herein incorporated by reference in its entirety. Accordingly, in some examples, at block 404, the controller 302 may determine a volume of build material that is needed to form each layer of the build volume 310 as well as the dimensions of the volume of build material that is to be provided on the build material support 102A that takes into account an additional volume of build material needed to form the supporting walls. For example, depending on the angle of repose of the build material being used, the controller 302 may determine the characteristics of the intermediate volume of build material needed for each layer of the build material, for example taking into account any slope of the supporting walls. The dimensions of the build volume, and hence the dimensions of the intermediate volume of build material to be provided, may thus differ for each layer in this example. For example, if the 3D printed supporting walls are to slope at 45 degrees, the dimensions of the build volume may decrease for each layer.

In other examples other build material containment systems may be used, for example such as variable size mechanical containment walls, positionable containment walls, or the like.

Figure 5A:
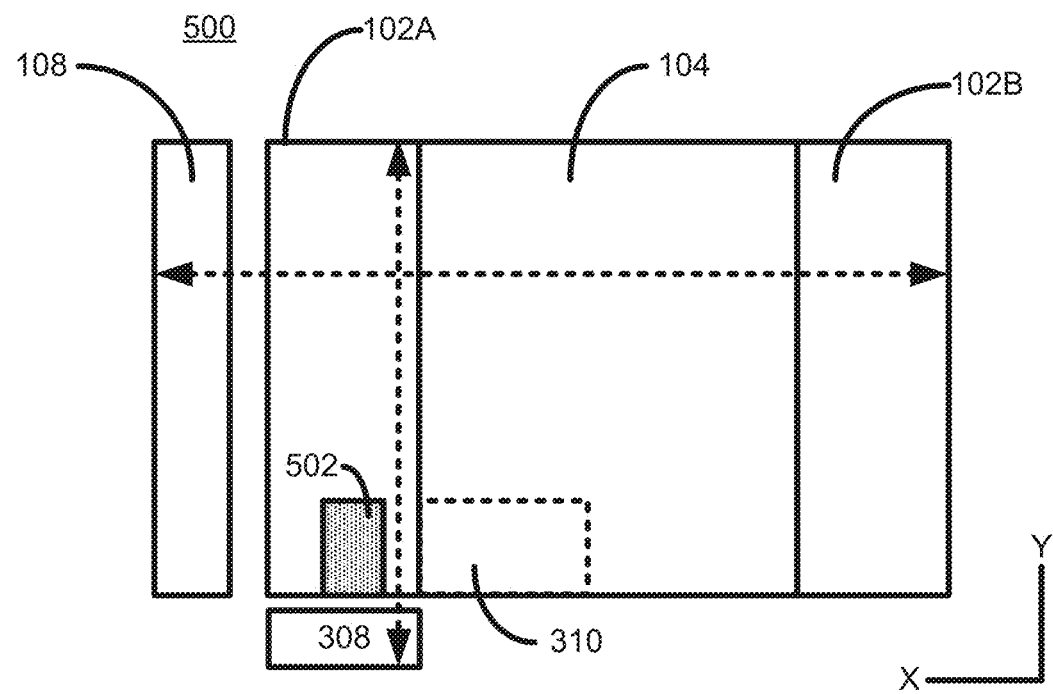
FIGS. 5A and 5B illustrate a build material spreading operation according to one example.
Figure 5B:
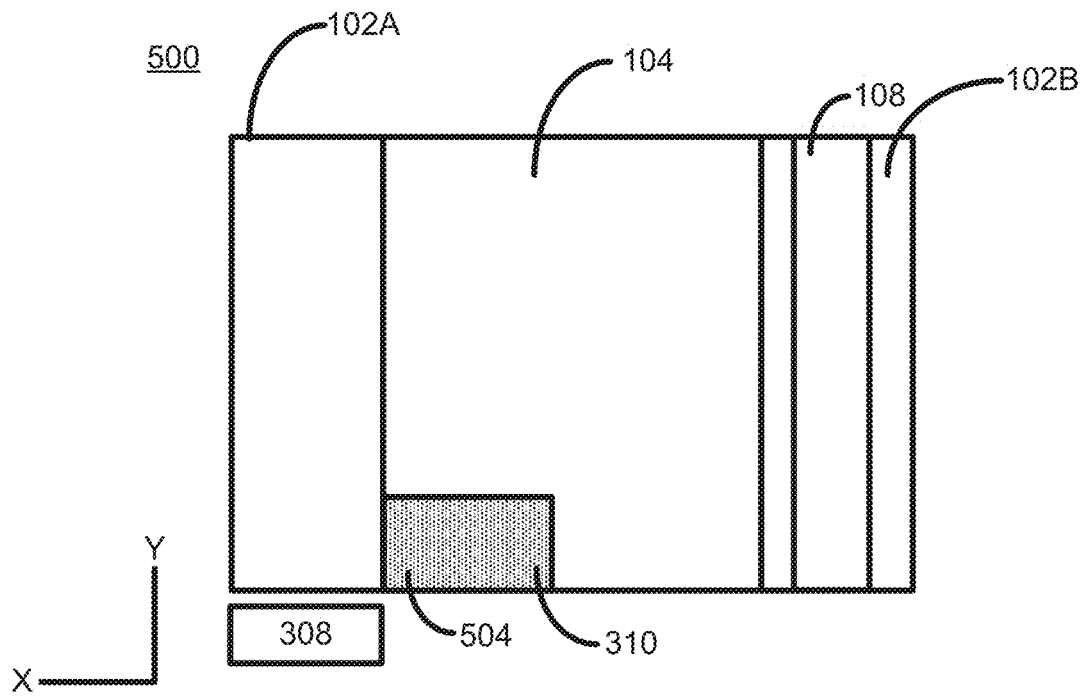

Turning now to FIG. 5, there is shown a further example in which the controller 302 controls the build material preparation module 308 to form an intermediate volume 502 build material that such that its y-axis dimension is substantially the same as the y-axis dimension of the determined build volume 310. However, in this example the quantity of build material provided is carefully controlled such that after spreading over the build platform 104 the x-axis dimensions of the formed layer 504 of build material matches, or at least more closely matches, the x-axis dimension of the determined build volume 310, as illustrated in FIG. 5B.

FIG. 6 illustrates a number of different examples of a suitable build material preparation module 308. In a first example, illustrated in FIG. 6A, the device 308 comprises a secondary recoater roller 602 configured to move along the y-axis along the length of the build material support 102A. In this example, the secondary recoater roller 602 has a length that is equal or substantially equal to the width of the build material support 102A. In one example the recoater roller 602 is also movable in the z-axis to enable the height of the recoater roller 602 to be adjusted relative to the build material support 102A. In the example shown the secondary recoater roller 602 is configured to be movable in an orthogonal axis to the axis of movement of the primary recoater roller 108, however, in other examples a different relative orientation may be used. In the example shown the secondary recoater roller 602 has an x-length that is the same, or is substantially the same, as the x-axis length of the build material support 102A.

In a further example, illustrated in FIG. 6B, the device 308 comprises a wiper or doctor blade 604.

In a yet further example, illustrated in FIG. 6C, the device 308 comprises a comb-like, or shaping, member 606. The member 606 comprises at least two vertically oriented shaping members, and a horizontal wiper or doctor blade. The height of the member 606 may be adjusted such that the shaping members are in contact with the surface of the build material support 102A.

FIGS. 7A to 7D illustrate a number of examples of how the build material preparation module 308 may be controlled to form a suitable volume of build material to be spread over the build platform 104 by the recoater 108.

In FIG. 7A, an initial volume of build material 702 is provided on the build material support 702. In the example shown the volume of build material 702 is provided along substantially the whole y-axis length of the build material support 102A. In one example the volume 702 of build material may be formed, for example, from an overhead hopper having an output port above and covering substantially the whole y-axis length of the build material support 102A. In another example the volume 702 of build material may be formed, for example, from a movable choked-flow hopper (not shown), that may be moved along the length of the build material support 102A. Such build material provisioning mechanisms used to form the initial volume 702 of build material may not be able to create differing volumes of build material, or may not be able to create volumes of build material having differing dimensions.

FIG. 7B illustrates an intermediate volume 704 of build material that is a result of the build material preparation module 308 having moved over and having shaped the initial volume 702 of build material. In this way, the build material preparation module 308 modifies the initial volume of build material 702 to form the intermediate volume of build material 704. As described herein, modification of the initial volume may comprise modifying one or more dimensions of the initial volume of build material. In one example, the modification of dimensions may be performed whilst maintaining the same initial volume of build material. In another example, the modification of dimensions may be performed whilst also modifying (e.g. reducing) the initial volume of build material.

For example, the intermediate volume 704 of build material may been formed using the secondary recoater 606 illustrated in FIG. 6C. As previously described, the controller 302 may control the height of the build material preparation module 308 to ensure that the dimensions of the formed intermediate volume 704 of build material corresponds to the dimensions of the build volume 310. In this example, the volume of the intermediate volume of build material 704 is smaller than the initial volume of build material 702. Excess build material removed by the build material preparation module 308 may, for example, be pushed or scraped into a lateral build material recovery chamber (not shown).

FIG. 7C illustrates an initial volume 706 of build material provided on the build material support 102A. In this case the volume 706 comprises a determined quantity of build material, but does not have determined y-axis dimension of the determined build volume 310. In this example, the controller 302 controls the height of the secondary recoater 602 or 604 illustrated in FIGS. 6A and 6B, such that the intermediate volume 708 of build material may be formed having the determined y-axis dimension, whilst maintaining the same initial volume of build material.

As illustrated in FIG. 7, an initial volume of build material may be provided on the build material support 102A. The volume of build material may be provided, for example, by an overhead hopper, or other suitable build material delivery mechanism.

Provision of a height adjustable build material preparation module 308 enables a volume of build material having a precise volume and dimensions to be formed on the build material support 102A even if the mechanism used to deliver the initial volume of build material is unable to provide a variable volume of build material or is unable to provide a volume of build material having a variable dimensions. Furthermore, the build material preparation module enables a 3D printing system to form layers of build material having variable width and length using a single and fixed length primary recoater mechanism. This may provide substantial flexibility in the operation of a 3D printing system.

Herein the term 'width' is generally used to denote the shortest of two planar dimensions and the term 'length' is generally used to denote the longest of two planar dimensions. However, these terms may, where appropriate, by interchanged and should not be interpreted in any limiting manner.

It will be appreciated that example described herein can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples described herein. Accordingly, some examples provide a program comprising code for implementing a system or method as claimed in any preceding claim and a machine readable storage storing such a program. Still further, some examples may be conveyed electronically via any medium such as a communication signal carried over a wired or wireless connection.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A build material distribution system to form a layer of build material on a build platform of a three-dimensional printer, comprising:
    a build material preparation device to form an intermediate volume of build material on a build material support;
    a recoater to spread the intermediate volume of build material over the build platform; and
    a controller to:
        obtain dimensions of a build volume to be processed;
        control the build material preparation device to form the intermediate volume of build material on the build material support, the intermediate volume having dimensions based on the obtained build volume dimensions; and
        control the recoater to spread the intermediate volume of build material over the build platform to form the layer of build material having at least one dimension associated with the build volume dimensions.

2. The system of claim 1, further including a build material distributor to form an initial volume of build material on the build material support, and wherein the build material preparation device is controlled to modify the initial volume of build material for the layer based on the obtained build volume dimensions.

3. The system of claim 2, wherein the build material distributor is to form the initial volume of build material along a length of the build material support.

4. The system of claim 2, wherein the build material preparation device is controlled to spread the initial volume of build material longitudinally along the build material support.

5. The system of claim 4, wherein the build material preparation device is to spread the initial volume of build material in an axis orthogonal to the spreading axis of the recoater.

6. The system of claim 2, wherein the build material preparation device is height adjustable to enable the length over which the initial volume of build material is spread to be varied in accordance with the build volume dimensions.

7. The system of claim 5, wherein the build material preparation device includes at least one of: a roller; a wiper; or a shaping member.

8. The system of claim 1, wherein the controller is to cause formation of a layer of build material that has at least one of an x-axis dimension or a y-axis dimension associated with a corresponding dimension of the build volume.

9. The system of claim 1, wherein the controller is to cause formation of a layer of build material that has both an x-axis dimension and a y-axis dimension associated with corresponding dimensions of the build volume.

10. The system of claim 1, wherein when the dimensions of the build volume are less than the dimensions of the build platform, controller is to cause formation of a layer of build material that has one or both of: an x-axis dimension less than a corresponding dimension of the build platform; a y-axis dimension less than a corresponding dimension of the build platform.

11. A method of forming a layer of build material on a build platform of a three-dimensional printing system, the method comprising:
    obtaining characteristics of a build volume to be processed;
    determining characteristics of a volume of build material to be used to form the layer;
    forming an intermediate volume of build material having the determined characteristics; and
    spreading the intermediate volume of build material over the build platform to form the layer.

12. The method of claim 11, wherein forming the intermediate volume of build material includes modifying an initial volume of build material formed on the build material support for the layer based on the determined characteristics of the volume of build material to be used to form the layer.

13. The method of claim 11, wherein forming the intermediate volume of build material includes forming a volume of build material having a length corresponding to a length of the build volume.

14. The method of claim 12, wherein forming the intermediate volume of build material further includes reducing a quantity of build material in the initial volume such that the formed layer of build material has a width corresponding to the width of the build volume.

15. A three-dimensional printer comprising a build material distribution system according to claim 1.

* * * * *